US011093492B1

United States Patent
Nair

(10) Patent No.: US 11,093,492 B1
(45) Date of Patent: Aug. 17, 2021

(54) SYSTEM AND METHOD OF FETCHING DATA FROM AN EXTERNAL PROGRAM

(71) Applicant: Ravishankar Narayanan Nair, St. Johns, FL (US)

(72) Inventor: Ravishankar Narayanan Nair, St. Johns, FL (US)

( * ) Notice: Subject to any disclaimer, the term of this patent is extended or adjusted under 35 U.S.C. 154(b) by 0 days.

(21) Appl. No.: 17/227,241

(22) Filed: Apr. 9, 2021

Related U.S. Application Data

(60) Provisional application No. 63/153,852, filed on Feb. 25, 2021.

(51) Int. Cl.
| | | |
|---|---|---|
| *G06F 17/30* | (2006.01) | |
| *G06F 16/2452* | (2019.01) | |
| *G06F 16/2453* | (2019.01) | |
| *G06N 20/00* | (2019.01) | |
| *G06F 16/248* | (2019.01) | |
| *G06F 16/22* | (2019.01) | |
| *G06F 16/2455* | (2019.01) | |

(52) U.S. Cl.
CPC .... *G06F 16/24522* (2019.01); *G06F 16/2282* (2019.01); *G06F 16/248* (2019.01); *G06F 16/24535* (2019.01); *G06F 16/24556* (2019.01); *G06N 20/00* (2019.01)

(58) Field of Classification Search
CPC ........... G06F 16/13; G06F 16/24; G06N 3/00; G06N 5/00; G05B 13/00
See application file for complete search history.

(56) References Cited

U.S. PATENT DOCUMENTS

| | | | | |
|---|---|---|---|---|
| 9,477,731 | B2* | 10/2016 | Kornacker | G06F 16/284 |
| 2014/0280032 | A1* | 9/2014 | Kornacker | G06F 16/2471 |
| | | | | 707/718 |
| 2015/0095308 | A1* | 4/2015 | Kornacker | G06F 16/24534 |
| | | | | 707/718 |
| 2016/0042069 | A1* | 2/2016 | Lee-Goldman | G06F 40/295 |
| | | | | 707/706 |
| 2019/0102342 | A1* | 4/2019 | Wang | G06F 16/258 |
| 2019/0180325 | A1* | 6/2019 | Carrasco | G06F 16/9535 |
| 2020/0081891 | A1* | 3/2020 | Pal | G06F 16/248 |
| 2020/0311063 | A1* | 10/2020 | Hariharasubrahmanian | |
| | | | | G06F 16/252 |

* cited by examiner

*Primary Examiner* — Hung D Le
(74) *Attorney, Agent, or Firm* — Barry Choobin; Patent 360

(57) ABSTRACT

A system and method for fetching data using an SQL query from the execution of an external code that may be in any language and executed in any environment. The system includes a query engine that can receive a query from a SQL interface and parses the query to the desired format. The system also includes a protocol server that can trigger a code executor to execute an external code based on the query and transmits the data returned by the external code to the query engine. The query engine can process the data to an SQL understandable format and present the processed data on the SQL interface.

13 Claims, 4 Drawing Sheets

Fig. 3

SYSTEM AND METHOD OF FETCHING DATA FROM AN EXTERNAL PROGRAM

CROSS-REFERENCE TO RELATED APPLICATIONS

This application claims priority to the U.S. provisional patent application Ser. No. 63/153,852, filed on Feb. 25, 2021, which is incorporated herein by reference in its entirety.

FIELD OF INVENTION

The present invention relates to a system and method for fetching data using structured query language from an external source, more particularly, the present invention relates to fetching data using structured query language from an external code that can be in any programming language and the data is fetched by the external code can be in structured or unstructured data form, moreover, the data can be fetched by the external code from a structured database, unstructured database, or an embedded application.

BACKGROUND OF THE INVENTION

Different types of databases are known in the art for use in receiving and storing information for later use. Different database management systems (DBMS) are also known that organizes the data within a database. Also known ARE relational databases where the data can be stored in terms of relations (tables). Hierarchical databases allow data to be stored as a tree-like structure. Network databases represent data through connected graphs. An object-oriented programming database is one that congruent with the data defined in objects and sub-objects (classes). A graph database uses graph structures for semantic queries with nodes, edges, and properties to represent and store data wherein the key concept of the system is the graph.

Regardless of the type of DBMS, SQL (Structured Query Language) is used as a default mechanism for querying most of the known structured databases including those discussed above. Besides querying structured databases, the SQL can also be used for other operations on the data of a supporting DBMS including selection (SELECT) for retrieval of data based on optional predicates (where) conditions to filter data, insertion (INSERT) for inserting new data, updating (UPDATE) for modifying existing data, and deletion (DELETE) for removal of the data.

While a user or an application (such as Microsoft Excel) requests certain data to be retrieved or modified, a query can be executed against the database. Such a query can be dynamic, say generating some parameters depending on some conditions (for example, get or delete data depending on some conditions like salary greater than 2000, where salary is a valid column in the existing relation/table in database). The database parses or understands the query and returns the results from the "existing" data set or modifies it.

The world of DMBS is existing in the industry for years. However, the existing DBMS requires pre-existing on which the quirky can be executed. For instance, a query to get the current weather in California in Fahrenheit requires the temperature information to be already present in a database. Although also known are methods that allow querying a streaming source, the data needs to be retrieved and stored in the streaming source, for example, Apache Kafka (A message broker which can collect and stream data from other sources). There are mechanisms within DBMS to write code using the DBMS's proprietary mechanisms (like Oracle's PL/SQL or Oracle Call Interface) where the data can be fetched. However, such a mechanism is specific to the DMBS and has many limitations.

Considering the ever-expanding data generated daily in structured and unstructured forms, and from embedded applications, a need is appreciated for a system and method that can fetch data from multiple unrelated external sources in near real-time.

SUMMARY OF THE INVENTION

The principal object of the present invention is therefore directed to a system and method for fetching data, in near-real-time, using an SQL interface from an independent external code.

In one aspect, disclosed is a system and method for fetching data queried by a SQL interface from external sources through execution of external code, wherein the external code on execution by a processor can fetch structured or unstructured data from an external database or an embedded application.

In one aspect, the external code can be independent of the DBMS and can be written in any programming language and returns the data in a structured or unstructured format that may or may not be SQL compatible.

In one aspect, the disclosed system can include a query engine that can receive a SQL query from a SQL interface. The query engine can parse the query in the desired format based on the associate program with the query. The system can further include a protocol server that can receive the parsed query, wherein the parsed query includes the name of the external code and host details of the protocol server. The protocol server can trigger the code executor to run the external code(s) which in near real-time fetches and returns the data to the protocol server, which bridges the data to the query engine without storing the data.

In one aspect, the data may not be stored in the protocol server, but transmitted in near time to the query engine, In one aspect, the query engine can format the data received from the protocol server to a SQL-compatible format.

In one aspect, the external code can be an embedded application or a code that can fetch data from a structured or unstructured data source. The program itself does not have any code but fetches the data upon execution by the processor. The external code can be any proprietary or non-proprietary code that is known in the art or can be developed for fetching data. The external code may also generate data, such as an embedding application or machine learning module can generate data, such as measurements, calculations, analysis, and like.

In one aspect, the external code may not be any SQL functions or PL/SQL or procedure or functions that exist as part of the database management system. It may not be any user-driven functions that are attached along with the database.

In one aspect, the external code can be written in any language that can be executed to fetch data from an embedded device or data source or can also generate the data. Herein the protocol refers to a communication protocol of the data between different execution environments. The term external code connotes any external code that can be executed by a processor to retrieve or generate data independent of the DBMS and includes machine learning models.

In one aspect, the external code can fetch or generate data connecting to the mainframe. In one case, the external code can fetch data through SFTP or FTP from a remote server or location. In one aspect, the external code can fetch data through a web server. In one aspect, the external code can be an embedded application or machine learning model. The external code can also modify existing data.

In one aspect, the disclosed system and computer-implemented method can provide access to innumerable external codes that can fetch data from different sources. Such a huge number of external codes can be accessed by SQL for fetching the ever-expanding data sources that were inaccessible before through an SQL interface. This creates a new paradigm in the world of data virtualization where existing tools can combine not only data from structure/unstructured/semi-structured and streaming data sources, but from an executable program as well. The disclosed system and method provide for execution, by a processor, of a query through a protocol server that is running on a port of the relevant operating system. The port can have a registry (mapping or dictionary) of some names (which are considered as tables) and the relevant external code(s) so that when users are querying the name, the corresponding external code is executed in near-real-time. The data from external code can be fed directly through the protocol using the protocol server to the query engine, without needing to cache or store the data in the code executor or the protocol server. The data received by the query engine may be in a format of the user's choice or based on the external code. The query engine maps the received format to SQL understandable format and renders the result. Once the resulting data is received by the users/applications, they can decide to store or consume the results in any way, much like how a traditional query output is used.

In one aspect, the protocols can be any standard protocol, like HTTP, HTTPS, RPC, TCP, or gRPC, any such protocol can be used without departing from the scope of the present invention.

In one aspect, the disclosed system and method can leverage vanilla gRPC and Protocol Buffers, so that there is no explicit need for stubs and skeletons when using gRPC protocol. If the user chose to implement and leverage HTTP/2 protocol, multiple requests and responses can be packed in a single connection to make data transfer faster. The choice of selecting a protocol is left to the implementer.

In one aspect, the query engine can be written in any programming language. A developer/user can implement the SQL interface, the protocol server, and the format converter, which are explained in detail in subsequent sections. The query engine, external code, and the format converter can be in any language (independently) and the external code can be "registered" in the protocol server port with a unique name (which will be the table name to query) so that the when the query hits the protocol server, it knows which code is to be executed against the unique name of the code and depending on the format, SQL generates the result accordingly after executing the external code.

In one aspect, the disclosed system and method allows a user to use SQL on a language and platform agnostic code deployed in a standard computer or cloud or embedded environment (that is language agnostic and device agnostic program) as long as the code returns the format understandable by the SQL (user can write this SQL interface as a one-time activity for the chosen format). The relevant language-agnostic or device-agnostic codes are registered in a protocol server. The query engine always directs the SQL towards the protocol server, depending on the name of the code, selects the code, and executes it after which the results can be sent to the user. In one case, proper authentication and secured mechanism can be used to secure the connection between the Query engine and the protocol server. Users can get results just like any other query on any DBMS, structured, unstructured, semi-structured, or streaming data source. The system and method allow seamless data transfer between existing non-code data sources and code-based data sources so that intermediate storages can be partially or completely eliminated. It is to be understood that systems like Oracle or Teradata are known which allows custom functions to be created within the database system (like a PL/SQL procedure or function or an Oracle Call Interface (OCI) program) and these can be executed within the database system. However, using such known systems, it is not possible to access an independent code written in any of the variety of programming languages known in the art. Hence, the disclosed system is advantageous by applying SQL on an existing or new external code (not writing the code within the database itself using the database's proprietary methods) and the relevant environment where the code under context is executed. Also are known approaches like CORBA (Common Request Broker Architecture), RMI (Remote Method Invocation), etc. in the industry, but all of these require Interface Definition Language (IDL) files, stubs, and skeletons to be generated each time for each kind of interaction and none of the known approaches can provides a SQL interface to external code and are not related to data access paradigms, but rather focus on inter-language communications.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

FIG. 3 is the sample output of a system implemented completely using the method described as part of the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
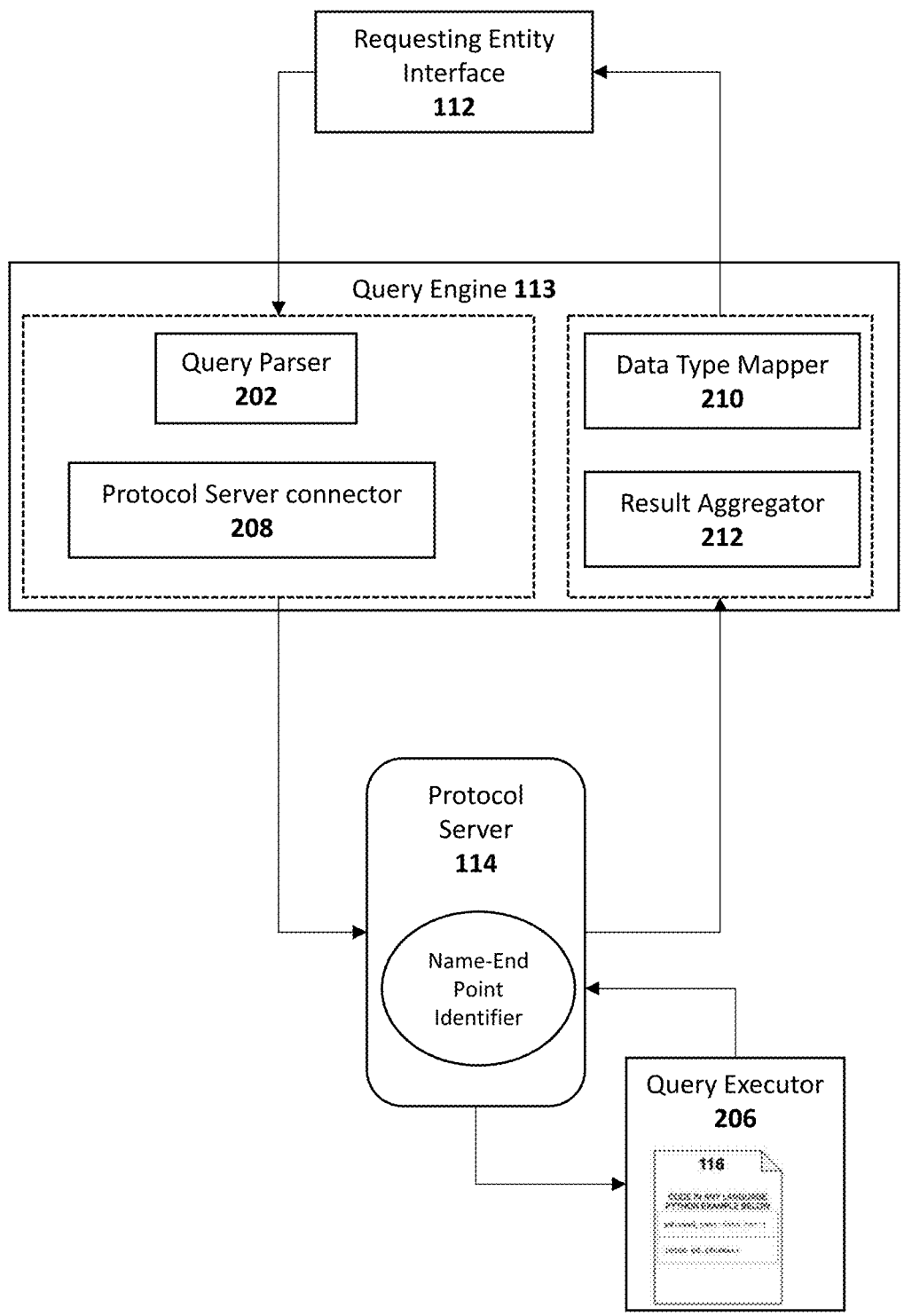
FIG. 1 is an environmental diagram showing the components of the disclosed system and a requesting entity interface, according to an exemplary embodiment of the present invention.

Disclosed is a system and method for processing SQL queries and more particularly, for executing queries to retrieve data from an existing or new external code written in any language and on any platform. Referring to FIG. 1, which is an environmental diagram showing an exemplary embodiment of the disclosed system. A requesting entity interface 112 can be provided which can receive a SQL query from a requesting entity for fetching data through the execution of an external code. Typically, the query can indicate at least one result specifying what data elements must be returned in the result and conditions (called predicates) used to evaluate whether certain data elements should be included in the result and sometimes simple transformations like minimum, maximum, etc. The requesting entity can be a human user, an application, an embedded device, or an IoT device. The query hits the query engine 113, which can have a query parser 202. The query parser 202 tokenizes the query and understands what the requesting entity is asking for-called the relation or table name. The query engine 113 can be stand-alone (one machine) or distributed (a cluster of machines). The query engine 113 plans the execution and depending on the relation's name (table name), connects to the protocol server 114 through the protocol server connector 208. The protocol server 114 can resolve the name of the code or function associated with the relation name or table name and provides the location where the code can be executed, and the same can be provided to the code executor 206. Using the desired protocol, code 116 can be executed by the Query executor 206 and can return the data in a certain format through the protocol to the protocol server which can in near real-time transfer the data received from the code executor to the query engine 113. Since the executed code is independent of the DBMS and can be in any language and can return the data in any known format, SQL may not understand the data returned in a custom or specific format, for example, JSON (JavaScript Object Notation) or CSV (Comma Separated Value). The query engine 113 can have a data type mapper 210 that may have the predefined mapping of how to convert the data in the received format to SQL data types. Once the conversion is completed, the Query Engine 113 can output the data in a compatible format to the requesting entity interface 112.

In one embodiment, the query can simultaneously connect to one or more different codes written in different languages on different platforms, which is referred herein to as joins. In this case, when query engine 113 receives the query, it identifies the presence of multiple relations (tables) while doing the query parsing. Then the names are passed to the protocol server 114 which triggers the code executor to execute the different code snippets associated with the requested names and gives data back either sequentially or parallel (as protocol supports) to query engine 113. The query engine 113 can have a data aggregator 212 that can join the data together and return the result. This kind of architecture can be very useful in platforms where there is a need to execute multiple API calls and aggregate the results.

In another case, assuming that the query engine 113 wants to join the data from an existing database table and the output of an executed external code. As described before, the query executor 206 executes the external code and returns the result. The query engine 113 in this case combines the result from existing database results and the results retrieved by the execution of the external code to get the desired combined result. This kind of architecture can be very useful in combining existing database data with the output of say, an Artificial Intelligence (AI) or machine learning code that is running externally.

Accordingly, in the world of data virtualization—where a certain number of different data sources are combined, the disclosed system and associated method may allow different codes in different languages to be virtualized. This gives the user/application seamless access to unified data or individual data from the code or function without explicitly knowing the location or environment or language in which the relevant and corresponding code is being executed.

In one exemplary embodiment, the system may be implemented as one or more software artifacts for use within a computer system (as a software application or embedded inside a chip). The programs(s) or application(s) include instructions in the certain programming language(s) (example: C, C++, Java, Python, Ruby, Golang, etc.) for performing embodiments of the invention (including the methods described herein) and may be stored on a variety of media. Examples of computer-readable media include, but are not limited to non-writable storage media on which information is permanently stored (example CD-ROM, etc.), Writable storage media on which alterable information is stored (example USB drive, hard disk, etc.), embedded code inside a chip (example Microprocessor instructions), or media through which information is conveyed to a computer, such as a computer to a computer network, wireless network to/from internet, telephone network, ethernet connection, etc.)

In general, the code executed to implement the embodiments of the invention may be part of an operating system, microprocessor, component, program, module, object, or sequence of instructions. The software of the present invention typically is comprised of a multitude of instructions that will be translated by the native machine to the machine-readable byte codes and hence executable instructions. Programs comprise data structures and variables that are either reside in memory or locally to the program. Protocols like HTTP, TCP, RPC, GRPC, etc. are used for communication between remote computers through ports. Also, various programs described hereinafter may be identified based upon the application for which they are implemented in a specific embodiment of the invention. However, it should be appreciated that any particular nomenclature that flows is used merely for convenience, and thus the invention should not be limited to use solely in any specific application identified and/or implied by such nomenclature.

Again, referring to FIG. 1 which illustrates the sequence diagram of the interactions and the components involved according to one embodiment of the invention. The disclosed system can provide a requesting entity interface 112 that can receive a query from the requesting entity. The requesting entity can either be a user (one who manually uses a SQL interface to issue the query) or an application like a reporting software or a chatbot software that requests the information through standard SQL. The disclosed system having the query engine 113 and the protocol server 114 can cause the code associated with the query to be executed by the code executor and return the data in SQL understandable format to the requesting entity interface 112.

The requesting entity can submit queries to get the data returned by an external code 116 which can be in any operating system or environment, or in any language. The external code is running in an existing environment and disclosed system can require the developer to add a wrapper method to convert to the desired format and also to register the data in that format in a protocol server, using the protocol of choice. As an example, if the existing code is connecting to another computer through SFTP and gets the data, the wrapper method takes that data and converts, say to JSON, and registers it in a protocol server. The query engine will have all the mapping required to get the data through the protocol and convert it to SQL data types. When the query engine asks for the data, the code is executed, converted to JSON, passes JSON data to query engine through the protocol, query engine maps the data to SQL and prints the result. The results can be sent in chunks and the query engine can receive the chunks in parallel and aggregates the results. The system may not be limited or dependent on any specific format(s) or protocol(s). It is to be understood that the data can be fetched from executing an external code while the query is issued, the data may not be in stored form. This is a key advantage of the disclosed system and associated method over querying structured or unstructured or streaming data which is already existing in a certain form in a data repository.

In one embodiment, the data returned by the external code in a certain format by the code executor 115 can be understood by the query engine 113, by way of mapping that's done as a one-time code embedded inside the query engine depending on the format under consideration. As an example, assume that the format of data is CSV (Comma Separated Value) and the code executor 115 is written in Python which creates a Pandas data frame (code 116). The system may require the developer to write a wrapper function that can convert the Pandas data frame to CSV and passes through a protocol, say HTTP. Query Engine 113 in FIGS. 1 and 2 when get the data through HTTP, it will have the mapping already defined: how to convert, say, a string data type of CSV to an SQL data type varchar. Hence depending on format and protocol, the mapping function responds to the user queries. Query Engine 113 in FIGS. 1 and 2 can be implemented with mapping for any standard or custom formats and there are no limitations. Similarly, any protocol can be used for data transfer.

In one embodiment, the external code 116 (FIG. 1) can be multiple and disparate. That means the possibility for multiple codes in multiple languages returning data in a certain format through a certain protocol. Again, different code bases can choose different formats and different protocols. One external code may be returning CSV format through HTTP, another may be returning Arrow format through Flight protocol, a third may be returning JSON through HTTP. The query Engine shown in FIGS. 1 and 2, can look at the connection to the protocol server, decide the protocol, executes the relevant method, gets data in the desired format, maps it back to SQL results, and returns to requesting entity. The requesting entity can pass parameters as well to any of the existing code.

The queries issued by requesting entity interface 112 may be predefined (i.e., hardcoded as part of application requirement or generated from another user interface depending on user inputs and conditions. For example, depending on the zip code, fetch the weather by executing code). In one embodiment, the queries by the application can be created by requesting entity interface 112. It can also come as part of a web application or mobile application wanting to generate certain reports or dashboards. Accordingly, all such implementations are broadly contemplated.

In one embodiment, the queries issued by the application can be nested. That allows the application to issue queries in which multiple selects are involved. An example is to select or retrieve all weather data depending on another retrieval which fetches all the zip codes near the current location. The two "selects" can connect with either one or two protocol servers, each returning data from different code in different languages and the query engine can aggregate them to render one single aggregated result. Hence the system is truly "polyglot". In this example, the first call gets the data related to all zip codes, maybe from a protocol server 1 using HTTP protocol in CSV format executing code in Python, which in turn is passed to the second query which fetches data for each zip code, by connecting to another protocol server, say gRPC executing the code in C++. The query can also include a subquery. A Subquery or Inner query or a Nested query is a query within another SQL query and embedded within the WHERE clause.

In one embodiment, the query engine can contain two parts within it. One part is request handling where the incoming query is parsed and thereby extracts the individual words or tokens in the query. The tokens will be indicating the Query Engine the fields/data required (also called columns) the relation (also called the table) name as well as the predicates (i.e., where conditions). A configuration in Query Engine will indicate that the engine must connect to a protocol server for the table name specified, which is done by the protocol server connector. Once the Query Engine makes the connection to the protocol server, the corresponding mapping or name of the code (called endpoint to execute) against the table name is retrieved. Query Engine now executes the code from the endpoint, and results are fetched. The results might be in a format that Query Engine does not understand currently, and hence it refers to the mapping file within and converts the data in the result format to SQL types for giving back to requesting entity. Results are aggregated as it is being rendered, either by a single fetch or parallel fetch.

Figure 3:
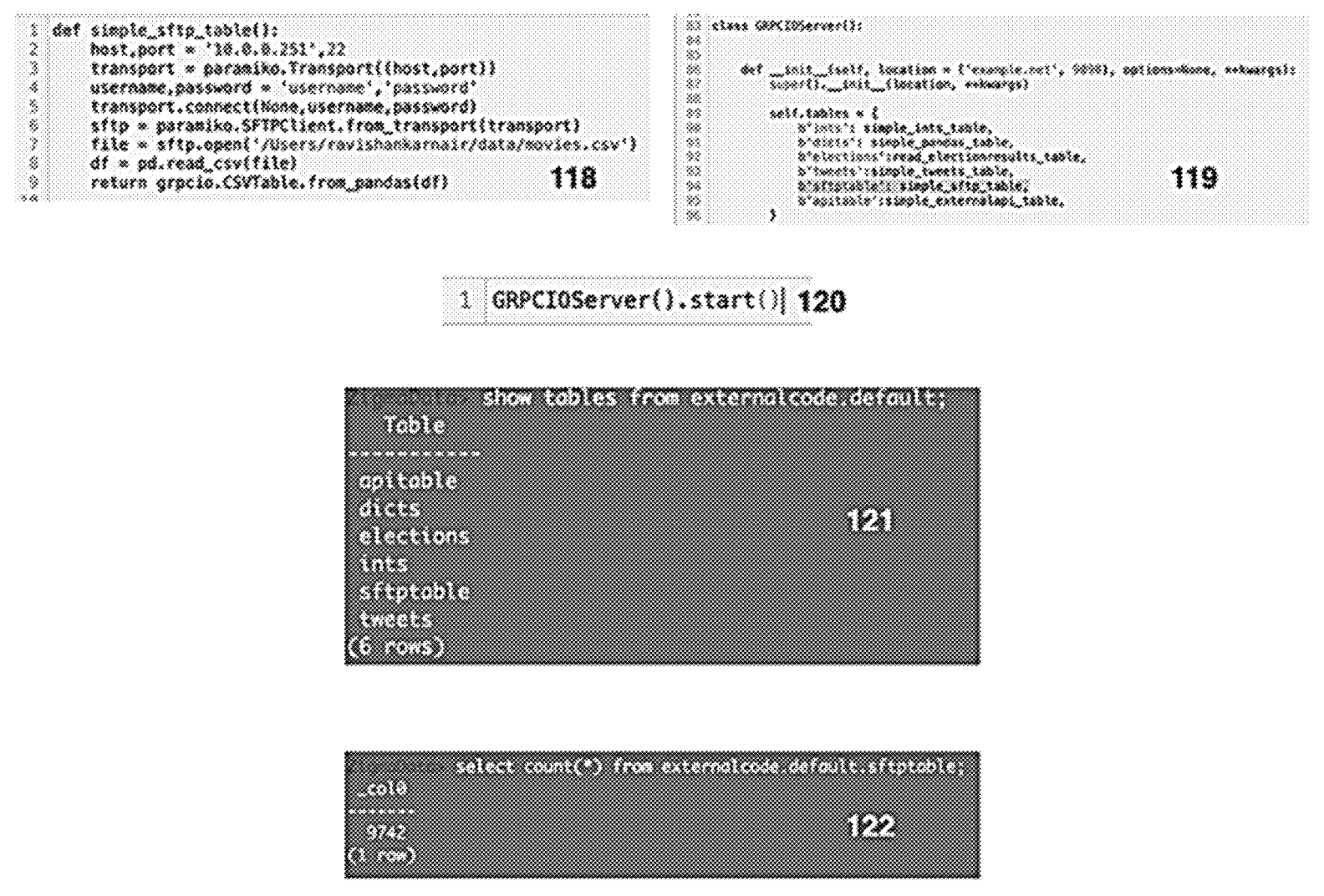

Referring to FIG. 3, which shows the screenshots of a working example done with a custom-built SQL Engine, gRPC protocol, and CSV data format. Window 118 shows an exemplary code written in python that can fetch data through SFTP from a remote machine. The external code shown in window 118 can return data in CSV format. In the next step, window 119 shows the step of registering the function shown in window 118 (step 1) with a name to the protocol server. At the next step, the protocol server can be started, as shown in window 120, the protocol server is listening on a port. Window 121 shows the next step, wherein the query engine asks for the table name. In response, all registered table names are shown in window 119 (step 2) can be displayed. Lastly, at step 5, shown by window 122, an SQL statement can be executed against the external function. The external code can be executed, and the results can be returned.

In window 121, the Query Engine connects to the gRPC protocol server and displays all tables registered. Note that each of these table names corresponds to some code. Finally, in window 122, the query calculates several rows, which internally calls the external code, calculates the number of rows, and displays.

In one embodiment, the parsing, query planning, and fetching of data by the Query Engine can be performed cost-effectively—reducing CPU and memory cost. Techniques like caching, distributed vs broadcast joins, query optimization, distributed query execution, failover during query execution, retry mechanism are also contemplated. There can be multiple protocol servers for the same protocol to make it dis-aggregated and hence scale effectively for high loads and high concurrency. The data response from the code engine can be made parallel so that large data is served in parallel in small chunks so that a single thread is not waiting for fetching all data.

In one exemplary embodiment, since the query engine is capable of executing external code as a data source, a Java Database Connectivity (JDBC) and ODBC (Open Database Connectivity) drivers can be built to connect to the query engine under consideration and hence allows a myriad of consuming applications like reports, dashboards, analytics, and machine learning applications to connect and consume the code as the data source.

Runtime View of Computing Environment

Figure 2:
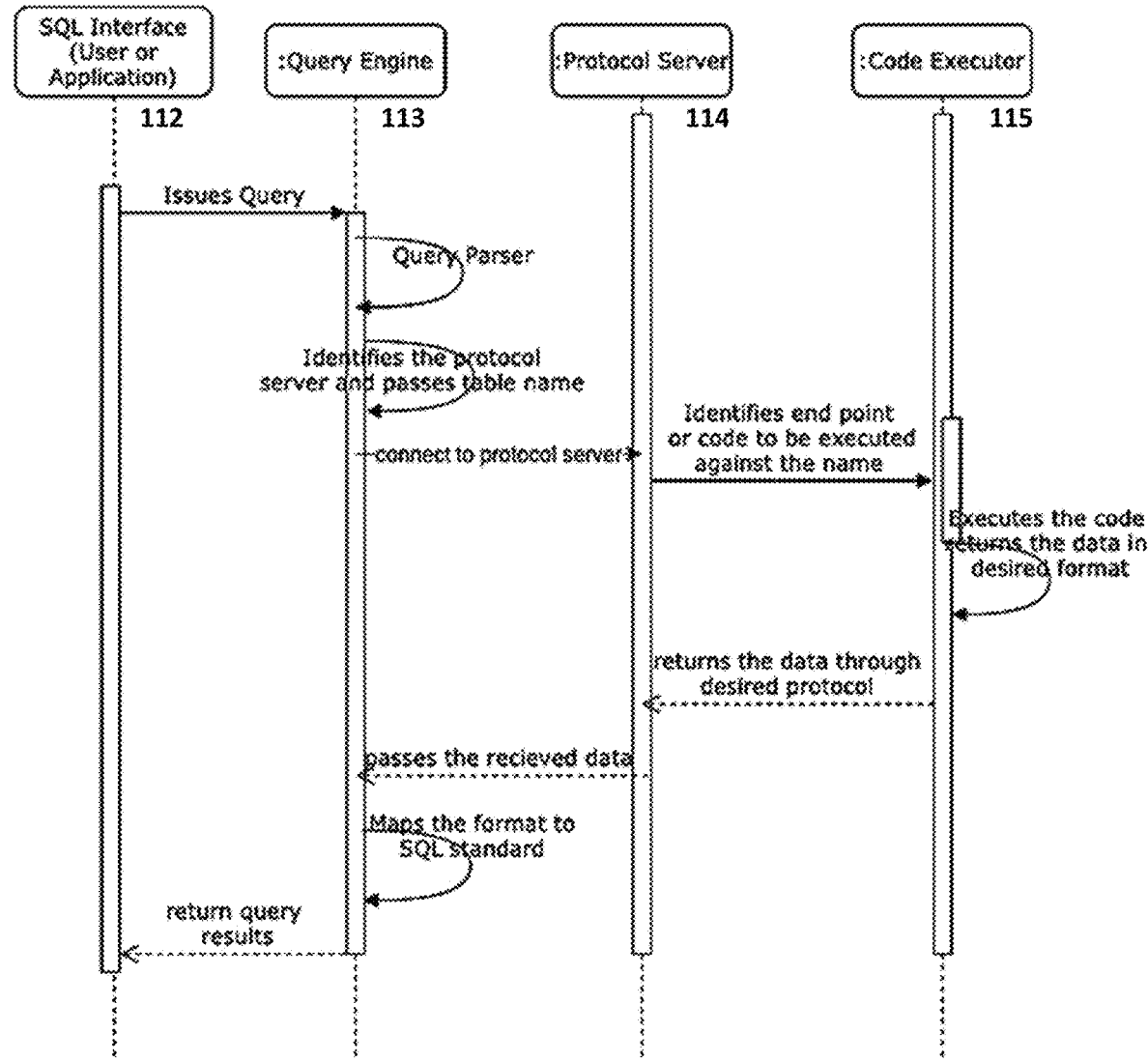
FIG. 2 illustrates the overall view of software components using UML (Unified Modelling Language) notation used to create and execute code as SQL data source, according to one embodiment of the invention.

FIGS. 1 and 2 show an illustrative relational view of software components, according to one exemplary embodiment of the invention. According to one aspect, the software components are configured for managing query execution against external code.

TABLE 1

Example of a query received through a requesting entity interface:

select city, zipcode, temperature from sampleserver.weather

Illustratively, an example query shown in Table 1 includes a select. It fetches the city, zip code, and temperature from a relation (table) named weather and the protocol server name sampleserver. In one embodiment, the weather is referred to as table name here, but it corresponds to some code. The query can optionally contain a where clause (predicates) to filter data. Once the query is parsed by the query engine, it records all this information for further processing.

TABLE 2 protocol server configuration example:

sampleserver
host=example.net
port=9090
protocol=gRPC

Given above is an example where the Query Engine refers for the protocol server details (114, FIG. 1), Table 2 contains the details from which Query Engine uses the protocol mentioned (gRPC) to connect to the host (example.net which is another computer) at port (9090).

TABLE 3

Protocol server name endpoint mapping: Sampleserver

| NAME | CODE/FUNCTION NAME |
|---|---|
| weather | executweatherdetails |

When SQL Query Engine connects to protocol server, it searches a map or dictionary and finds that the name weather is mapped to a function names executeweatherdetals. This is shown pictorially in Table 3.

TABLE 4

Actual function definition:

executeweatherdetails( )
Below is an illustrative code in Python
res=requests.get('http://api.openweathermap.org/data/2.5/weather?'+
query+'&APPID=*****************************&&units=metric');
return res.csv( ); #note that the code is returning CSV format The SQL Engine executes the method in Table 4, which is an external code. The data is returned back as CSV through the protocol gRPC.

TABLE 5

DATA FORMAT MAPPING (SAMPLE IN JAVA):

put("String", Integer.valueOf(Types.VARCHAR));
put("Boolean", Integer.valueOf(Types.BOOLEAN));
put("Byte", Integer.valueOf(Types.TINYINT));
put("Short", Integer.valueOf(Types.SMALLINT));
put("Int", Integer.valueOf(Types.INTEGER));
put("Integer", Integer.valueOf(Types.INTEGER));
put("Long", Integer.valueOf(Types.BIGINT));
put("Float", Integer.valueOf(Types.FLOAT));
put("Double", Integer.valueOf(Types.DOUBLE));
put("BigDecimal", Integer.valueOf(Types.DECIMAL));
put("Date", Integer.valueOf(Types.DATE));
put("Time", Integer.valueOf(Types.TIME));
put("Timestamp", Integer.valueOf(Types.TIMESTAMP));
put("Blob", Integer.valueOf(Types.BLOB));
put("Clob", Integer.valueOf(Types.CLOB));
put("expression", Integer.valueOf(Types.BLOB));

Finally, once the CSV data is received by SQL Engine, it needs to convert back to SQL types for SQL compatibility. A sample mapping for CSV to SQL Types is shown in Table 5. Using the mapping, all CSV data received through the protocol is translated to SQL types, and results are printed back.

Another similar example would be to create an SQL Engine that has Arrow format to SQL type mapping. Then use Arrow format to send data from external code through Flight protocol. SQL Engine can connect to Flight, execute the method, gets the data, convert it back to SQL.

One embodiment of the innovation is, as illustrated, is that an SQL engine written in any language with the proper format to SQL type format converter can thus execute any external code in any language (not necessarily the language in which SQL Engine is written!), gets result through a certain protocol in a certain format (Given that format converter is built-in SQL Engine).

Managing the Query Execution

What's being done is the ability to extend the query engines to include the ability to execute the external code. The extra enhancement to existing query engines is the format mapper for the format under consideration and the ability to talk to a protocol server. The query planner, query executer, query scheduler, query optimizer, etc. are the core components of any query engine and the invention extends any such engine or optionally create one to have the unique and differentiating capability that none of the query engines currently have—the ability to execute external code in any language through a format. It should be noted that one embodiment of the invention is this extra capability for query engines or a newly created query engine.

Figure 4:
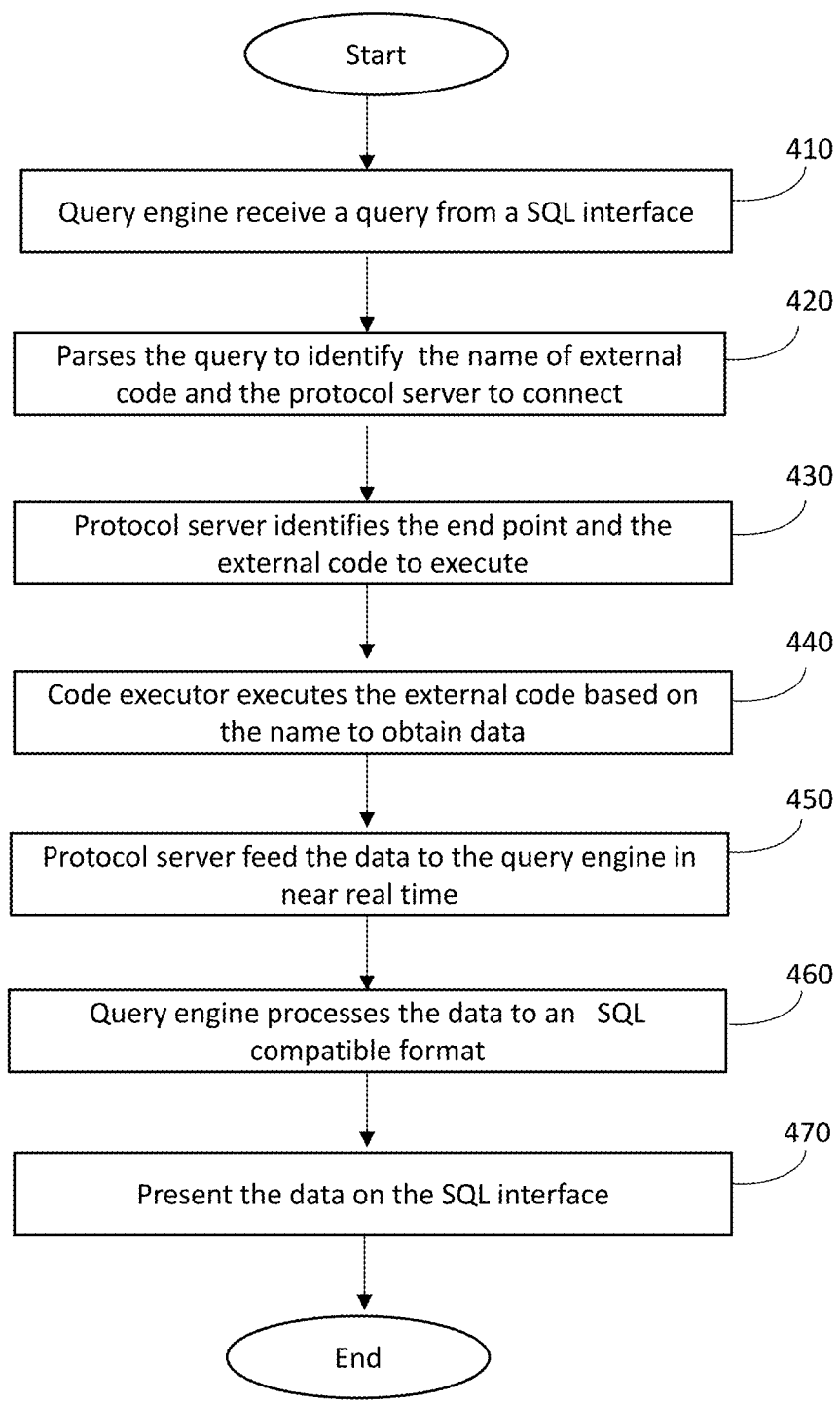
FIG. 4 is a flow chart illustrating steps of fetching data from executing an external code, according to one embodiment of the invention.

Referring to FIG. 4, which is a flow chart illustrating the disclosed method of fetching data using a SQL query from an external code. At step 410, a query can be received by the query engine from a SQO interface. The query engine can parse the query to identify the name of an external code and the protocol server to connect, at step 420. Protocol server identifies the end point and the external code to execute, at step 430. The code executor can execute the external code based on the name to obtain data, at step 440. The protocol server feeds the data to the query engine in near real time, at step 450. Query engine processes the data to an SQL compatible format, at step 460. The data can be presented on the SQL interface, at step 470.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A computer-implemented method for fetching data from an external source in response to an SQL query, the method comprising the steps of:
    receiving, by a query engine, from an SQL interface, a query having one or more unique identifiers, the one or more unique identifiers refers to one or more external codes;
    parsing, by the query engine, the query to a desired format;
    receiving, by a protocol server, from the query engine, the parsed query;
    triggering, by the protocol server, a code executor which executes at least one of the one or more external codes to obtain data in a first format;
    transmitting, in near real-time, by the protocol server, the data in the first format to the query engine; and
    processing, by the query engine, the data in the first format to a data in the second format, wherein the data in the first format is incompatible with the SQL interface and the data in the second format is compatible with the SQL interface.

2. The computer implemented method according to claim 1, wherein the code executor executes two or more external codes and the protocol server separately transmits the data as two or more feeds received from the execution of the two or more external codes, the query engine aggregates the two or more feeds to a combined data that is presented on the SQL interface.

3. The computer implemented method according to claim 1, wherein the at least one of the one or more external codes has no limitation of programming language in which the at least one external code is written and an environment in which the at least one external code is executed.

4. The computer implemented method according to claim 1, wherein the at least one external code is an embedded application of an electronic device.

5. The computer implemented method according to claim 4, wherein electronic device is an IoT device.

6. The computer implemented method according to claim 1, wherein the data in the first format is fetched from a web server.

7. The computer implemented method according to claim 2, wherein at least two of the two or more external codes are in different programming language and executed in a different environment, and the two feeds received from the at least two external codes are in a different format, wherein the query engine processes the two feeds in a format compatible with the SQL interface.

8. The computer implemented method according to claim 1, wherein the code executor and the protocol server do not cache or store the data in the first format.

9. The computer implemented method according to claim 1, wherein each the query engine, the code executor, and the protocol server are in different programming languages.

10. The computer implemented method according to claim 1, wherein the query comprises server name, the query engine configured to manage the configuration of which protocol server to be connected based on the server name.

11. The computer implemented method according to claim 1, wherein the protocol server is configured with a registry of table names received from the query engine and associated external codes.

12. The computer implemented method according to claim 1, wherein the query engine creates a subquery within the query, wherein the query refers to one external code and the subquery refers to another external code, the two external codes are in same or different languages and executed in same or different environments.

13. The computer implemented method according to claim 1, wherein the at least one of the one or more external codes is a machine learning model, the machine learning model generates the data or fetches the data from an external data source.

* * * * *